Dec. 28, 1965  F. J. REITHEL  3,226,250
ANTI-FOGGING TREATMENT FOR FILM AND COATED PRODUCTS
Filed Jan. 11, 1962

Coating an alkenyl aromatic resinous shaped article with a coating composition consisting of a water soluble cellulose ether.

↓

Dry the coating to provide a continuous coating having a weight of at least 0.002 milligram per square foot.

Fig. 1

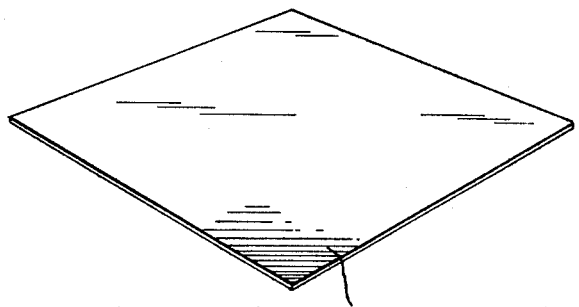

Alkenyl aromatic resinous sheet having coating of a water soluble cellulose ether.

Fig. 2

INVENTOR.
Fred J. Reithel
BY
AGENT

United States Patent Office 3,226,250
Patented Dec. 28, 1965

3,226,250
ANTI-FOGGING TREATMENT FOR FILM
AND COATED PRODUCTS
Fred J. Reithel, Freeland, Mich., assignor to The Dow
Chemical Company, Midland, Mich., a corporation of
Delaware
Filed Jan. 11, 1962, Ser. No. 165,659
4 Claims. (Cl. 117—138.8)

This invention relates to anti-fogging thermoplastic resinous hydrophobic film and sheet and pertains to a method for the preparation thereof. It more particularly relates to articles of manufacture comprising a thermoplastic resinous hydrophobic polymer film or sheet having on at least one of its surfaces a coating of an anti-fogging composition.

Certain thermoplastic resinous hydrophobic polymers, because of their transparency and clarity, have potential use in the field of packaging, particularly in uses where an article is packed in a container having a transparent window for viewing of the contents while at the same time protecting it from dust and other contamination. However, the tendency of hydrophobic polymeric film or sheet toward fogging when exposed to high humidity conditions by the condensing of moisture in the form of small individual droplets on the surface of the film or sheet not only is unslightly, but renders the film opaque in appearance.

It is a principal object of this invention to provide an anti-fogging treatment that will maintain transparent thermoplastic resinous hydrophobic sheet or film transparent under exposure to high humidity conditions and which is effective for long periods of time.

Another object is to provide new articles of manufacture comprising a transparent thermoplastic resinous hydrophobic film or sheet structure having on at least one of its surfaces, preferably on each of its major surfaces, an anti-fogging composition capable of maintaining the film or sheet in a visually transparent condition under high humidity conditions.

A further object of the invention is to provide a non-tacky, anti-static, non-blocking at 60° centigrade film with good slip characteristics and high scratch resistance.

Another object of this invention is to provide a transparent thermoplastic resinous hydrophobic film sheet structure having an anti-fogging composition on at least one of its major surfaces which is free from salts of any type.

According to the invention, anti-fogging thermoplastic resinous hydrophobic shaped articles such as film and sheet are maintained transparent under conditions of high humidity by preparing a solution of a methyl cellulose in water, subsequently applying said solution of methyl cellulose to the surface of an alkenyl aromatic resinous film and drying said coating to form a coherent continuous coating having a coating weight of at least 0.002 milligram per square foot. FIGURES 1 and 2 depict the method and article of the invention, respectively.

The transparent thermoplastic resinous hydrophobic film or sheet which may be employed in the practice of the invention may be prepared from alkenyl aromatic resins. By an alkenyl aromatic resin is meant a solid polymer of one or more polymerizable alkenyl aromatic compounds. The polymer or copolymer comprises in chemically combined form, at least 50 percent by weight of at least one alkenyl aromatic compound having the general formula:

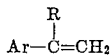

wherein "Ar" represents an aromatic hydrocarbon radical, or an aromatic halohydrocarbon radical of the benzene series and "R" is hydrogen or the methyl radical. Examples of such alkenyl aromatic resins are the solid homopolymers of styrene, alpha-methylstyrene, ortho-methylstyrene, meta-methylstyrene, para-methylstyrene, ar-ethylstyrene, ar-vinylxylene, ar-chlorostyrene or ar-bromostyrene; the solid copolymers of two or more of such alkenyl aromatic compounds with minor amounts of other readily polymerizable olefinic compounds such as divinylbenzene, methyl-methacrylate or acrylonitrile, etc.

It is essential that the methyl cellulose employed be substantially water soluble under the conditions of use, which limits to some extent the size of the substituting groups which may be present.

Methyl celluloses which are used in the practice of the invention include water-soluble cellulose ethers comprised of units of the empirical formula:

wherein G represents the anhydroglucose unit of the cellulose molecule, R is selected from the group consisting of methoxyl and methylmethoxyl, and R' is selected from the group consisting of hydroxyethyl, hydroxypropoxy, carboxymethyl, hydroxybutyl, with the further limitation that R can only be methylmethoxyl when R' is hydroxyethyl.

The above methyl cellulose materials exhibit sufficient surface activity to permit wetting of the alkenyl aromatic substrate and exhibit the claimed anti-fogging and anti-static properties.

For example, a commercial product, Methocel 60 HG, has been found to be quite satisfactory for use as the coating composition.

"Methocel" 60 HG is the trade name for hydroxypropyl methyl cellulose (the mixed methyl and hydroxypropyl ether of cellulose) having a methoxyl content of from 28 to 30 percent and a hydroxypropoxyl content of from 7 to 12 percent. It is prepared by reacting methyl cellulose with caustic soda and then with propylene oxide.

"Methocel" 60 HG in aqueous solution has the following properties:

Surface tension _____ 44–50 dynes/cm.
   (25° C.).
Interfacial tension (paraffin
   oil) _____ 18–18 dynes/cm.
   (25° C.).
pH _____ Neutral.
Solution stability _____ Stable from pH 2 to pH
   12 at 20° C.

Specific gravity, 20°/4° C.:
   1 percent _____ 1.0012.
   5 percent _____ 1.0117.
   10 percent _____ 1.0245.

The anti-fogging coating compositions are prepared by dissolving a methyl cellulose in water; generally this can be done simply by admixing the cellulose and water and allowing to stand until homogeneous solution is obtained. Advantageously, agitation will considerably accelerate the rate of solution.

Since only small proportions of the composition are required to produce a continuous coating or layer of the composition on the surfaces of the film or sheet and are effective in maintaining the resinous sheet transparent, the ingredients of the composition are mixed together in the liquid medium in the desired proportions in a total concentration of at least 0.1 percent, suitably from 0.1 to 10 percent by weight of the liquid dispersion or solution. Such dispersion or solution of the ingredients of the anti-fogging composition is applied to the surfaces of the sheet or film by brushing, dipping, spraying, roller coating or by doctor blade, and when applied as a wet layer of the dispersion or solution having a thickness of from about 0.1 to 1 mil, then dried, usually results in a continuous coating of from about 0.007 to about 0.033 milligram per square foot of the anti-fogging composition on the treated surfaces of the film or sheet. This range is particularly beneficial as it provides close to optimum thickness for most applications and allows for ready application by conventional means.

In some cases, certain alkenyl aromatic resins are prepared commercially having a thin layer of hydrophobic oily substance on at least one surface; if such layer is excessively thick, treatment of the film is facilitated by washing the surface with a detergent or solvent prior to treatment in accordance with the invention.

The coated films and sheets of the invention are useful for a variety of purposes in the home and industry, such as packaging articles in cardboard boxes having viewing windows therein, as substitutes for glass window panes, or for packaging comestibles.

The following examples illustrate ways in which the principle of the invention has been applied, but are not to be construed as limiting its scope.

A plurality of aqueous solutions containing one percent by weight of various methyl celluloses were prepared. These solutions were aged for about 24 hours and then cast onto a sheet of oriented 1 mil thick polystyrene to give a continuous coating. The wet coatings were dried in a forced air oven at a temperature of about 80°–85° Fahrenheit for a period of about 2 minutes.

Portions of the coated polystyrene film were tested for fogging by securing the film, coated side down, with a rubber band over the top of a 32 ounce glass jar containing about 6 ounces of water at 25°. The jar was placed in a refrigerator for 2 minutes, then was removed and examined for fogging. The results are set forth in Table I.

One percent methyl cellulose solutions were diluted to $\frac{1}{10}$ of 1 percent and coated onto one mil thick polystyrene film to give coating weights of about 0.033 milligram per square foot and about 0.0033 milligram per square foot. The wetting and anti-fogging characteristics are designated by numbers in the respective columns. The numbers designate the following: (1) perfect performance of wetting or anti-fogging and (2) slightly irregular coating when referring to the wetting characteristics or in the case of anti-fogging properties, indicates small fogged areas which appeared which were less than 20 percent of the total area tested, the remainder being clear.

As well as improving the anti-fogging characteristics of the oriented polystyrene film, the following benefits were also achieved. The methyl cellulose coatings were found to frequently give anti-scratch protection to oriented polystyrene when deposited on the film from aqueous solutions. The coated film had anti-static properties, which is in sharp contrast to the original characteristics of the material. Beneficially, the resistance of the coated polystyrene film to solvent attack was considerably improved; for example, if acetone is poured onto a sheet of one mil polystyrene film which is without the methocel coating, the uncoated material dissolves immediately. However, the coated material acquired a frosted appearance and distorted, but was not completely eroded as was the plain film. In molding and similar forming operations wherein a plurality of like parts are produced which will nest or stack one within the other, coating of the shaped articles is particularly beneficial as the tendency for sticking of the articles to each other is substantially eliminated. In a similar manner, other alkenyl aromatic resinous materials such as hereinbefore described give commensurate results when treated with methyl cellulose solutions in the manner of the invention.

As is apparent, the method of the invention is susceptible of being embodied with various alterations and modifications from that which has been described in the preceding description and specification. Therefore, it is to be fully understood that all of the foregoing is merely intended to be illustrative and is not to be construed or interpreted as being restrictive or otherwise limiting of the present invention, excepting as it is set forth and defined in the appended claims.

What is claimed is:

1. A coated alkenyl aromatic resinous hydrophobic shaped article resistant to fogging, said article having a coating on at least one surface thereof, said coating consisting of a continuous film of a water-soluble methyl cellulose at a coating weight of at least 0.002 milligram per square foot the methyl cellulose being soluble in water under the conditions of use.

2. The article of claim 1, wherein said article is a thin film.

3. The article of claim 2, wherein said alkenyl aromatic resin is polystyrene.

4. The article of claim 3, wherein said article is a transparent wrapping film.

(References on following page)

Table I

| Cellulose sample | Weight percent $OCH^3$ | Weight percent $OC^3H^6OH$ | Viscosity, 2 percent aqueous solution | 1.0 Percent | | 0.1 Percent | |
|---|---|---|---|---|---|---|---|
| | | | | Wetting | A.F. | Wetting | A.F. |
| 1 | 28.1 | | 10 | 1 | 1 | 1 | 1 |
| 2 | | | 100 | 1 | 1 | 1 | 1 |
| 3 | 28.4 | | 4,000 | 2 | 1 | 1 | 1 |
| 4 | 30.2 | | 8,000 | 1 | 1 | 1 | 1 |
| 5 | 27.9 | 8.1 | 100 | 1 | 1 | 1 | 1 |
| 6 | 28.3 | 9.2 | 4,000 | 2 | 1 | | |
| 7 | 28.2 | 11.0 | 50 | 1 | 1 | 1 | 1 |
| 8 | 27.5 | 6.0 | 100 | 1 | 1 | | |
| 9 | 22.6 | 5.8 | 100 | 2 | 1 | 1 | 1 |
| 10 | 22.0 | 8.2 | 15,000 | 1 | 1 | 1 | 1 |
| 11 | 23.1 | | 240 | 1 | 1 | 1 | 1 |
| 12 | 24.5 | | 207 | 1 | 1 | | |
| 13 | 25.8 | | | 1 | 1 | | |
| 14 | 36.0 | | | 1 | 1 | 1 | 1 |
| 15 | 27.8 | 3.77 | 424 | 1 | 1 | 1 | 1 |
| 16 | 26.6 | 6.71 | 19 | 1 | 1 | | |
| 17 | 26.1 | 8.43 | 11 | 1 | 2 | 1 | 1 |
| 18 | 25.4 | 11.49 | 118 | 1 | 1 | 1 | 1 |
| 19 | 23.8 | 4.66 | 65 | 1 | 1 | 1 | 1 |
| 20 | 23.8 | 7.43 | 374 | 1 | 1 | | |
| 21 | 22.4 | 10.19 | 577 | 1 | 1 | 1 | 1 |
| 22 | 17.9 | 14.0 | 829 | 1 | 1 | 1 | 1 |
| 23 | 29.5 | 6.22 | 699 | 1 | 1 | 1 | 1 |

References Cited by the Examiner

UNITED STATES PATENTS

| | | | |
|---|---|---|---|
| 2,416,051 | 2/1947 | Gilbert | 117—165 |
| 2,427,262 | 9/1947 | Delano | 202—234 |
| 2,628,923 | 2/1953 | Yaeger | 117—138.8 |
| 2,702,255 | 2/1955 | Yaeger | 117—138.8 |
| 2,979,410 | 4/1961 | Parlour | 117—138.8 |
| 3,022,178 | 2/1962 | Park et al. | 106—13 |
| 3,099,350 | 7/1963 | Hammond | 117—166 |

WILLIAM D. MARTIN, *Primary Examiner.*

RICHARD D. NEVIUS, *Examiner.*